United States Patent [19]
Prevorsek et al.

[11] Patent Number: 5,545,455
[45] Date of Patent: Aug. 13, 1996

[54] CONSTRUCTIONS HAVING IMPROVED PENETRATION RESISTANCE

[75] Inventors: Dusan C. Prevorsek, Morristown; Kwok W. Lem, Randolph; Hsin L. Li, Parsippany; Young D. Kwon, Mendham, all of N.J.

[73] Assignee: AlliedSignal Inc., Morristown, N.J.

[21] Appl. No.: 378,983

[22] Filed: Jan. 24, 1995

Related U.S. Application Data

[63] Continuation of Ser. No. 41,363, Apr. 1, 1993, abandoned.

[51] Int. Cl.⁶ .............................. F41H 1/02; B32B 1/04; B32B 3/06; B32B 5/12
[52] U.S. Cl. .................. 428/76; 2/2.5; 428/102; 428/113; 428/252; 428/287; 428/298; 428/303; 428/377; 428/911
[58] Field of Search ............................ 428/74, 76, 198, 428/196, 911, 377, 36.1, 36.3

[56] References Cited

U.S. PATENT DOCUMENTS

| | | | |
|---|---|---|---|
| 2,697,054 | 12/1954 | Dietz et al. | 428/911 |
| 2,744,846 | 5/1956 | Stichles | 428/196 |
| 2,773,791 | 12/1956 | MacIver | 428/911 |
| 3,841,954 | 10/1974 | Lawler | 428/911 |
| 3,855,632 | 12/1974 | Davis | 2/2.5 |
| 3,971,072 | 7/1976 | Armellino | 2/2.5 |
| 3,988,780 | 11/1976 | Armellino | 2/2.5 |
| 4,183,097 | 1/1980 | Mellian | 2/2.5 |
| 4,316,404 | 2/1982 | Medlin | 428/911 |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,510,200 | 4/1985 | Samowich | 428/252 |
| 4,522,871 | 6/1985 | Armellino, Jr. et al. | 428/252 |
| 4,543,286 | 9/1985 | Harpell et al. | 428/288 |
| 4,550,044 | 11/1985 | Rosenberg et al. | 428/911 |
| 4,563,392 | 1/1986 | Harpell et al. | 428/394 |
| 4,623,574 | 11/1986 | Harpell et al. | 428/113 |
| 4,650,710 | 3/1987 | Harpell et al. | 428/263 |
| 4,681,792 | 7/1987 | Harpell et al. | 428/911 |
| 4,737,401 | 4/1988 | Harpell et al. | 428/252 |
| 4,748,064 | 5/1988 | Harpell et al. | 428/113 |
| 4,916,000 | 4/1990 | Li et al. | 428/105 |

FOREIGN PATENT DOCUMENTS

| | | |
|---|---|---|
| 0122857 | 4/1984 | European Pat. Off. |
| 2931110 | 2/1981 | Germany |
| WO92/08095 | 5/1992 | WIPO |

Primary Examiner—James D. Withers
Attorney, Agent, or Firm—Melanie L. Brown; Renee J. Rymarz

[57] ABSTRACT

An improved rigid composite of the type comprising a plurality of fibrous layers at least two of which are secured together by a securing means, said improvements comprising a securing means which comprises at least two adjacent paths.

26 Claims, 1 Drawing Sheet

CONSTRUCTIONS HAVING IMPROVED PENETRATION RESISTANCE

This application is a continuation of application Ser. No. 08/041,363 filed Apr. 1, 1993, now abandoned.

BACKGROUND OF THE INVENTION

1. Field of the Invention

This invention relates to composites having improved penetration resistance and to articles fabricated totally or in part from same. More particularly, this invention relates to such articles which are fiber based and which are especially suitable for fabrication into rigid penetration resistant articles such as vehicle panels, spall liners for military vehicles and the like.

2. Prior Art

Ballistic articles such as structural members of helicopters and other military equipment, vehicle panels and the like containing high strength fibers are known. Illustrative of such articles are those described in U.S. Pat. Nos. 3,971,072; 3,988,780; 4,183,097; 3,855,632; 4,522,871; 4,510,200; 4,623,574; 4,748,064; 4,916,000; 4,403,012; 4,457,985; 4,650,710; 4,681,792; 4,737,401; 4,543,286; 4,563,392; and 4,501,856.

SUMMARY OF THE INVENTION

This invention relates to a rigid penetration resistant composite comprising a plurality of fibrous layers, said fibrous layers (preferably having a thickness of from about 0.01 in.(0.025 cm..) to about two inches (5.08 cm..)) comprised of a network of fibers dispersed in a polymeric matrix, at least two of said layers secured together by a plurality of securing means ( preferably extending along at least two spaced paths, more preferably adjacent or substantially adjacent spaced paths, and most preferably wherein the distance between said spaced paths is equal to or less than about six inches (15 cm.)), wherein said secured fibrous layers are preferably encircled by one or more fibrous layers forming a girdle about an axis thereof. Another embodiment of this invention relates to a ballistic resistant article comprising a body which is formed totally or in part from the composite of this invention; and which preferably comprises at least one hard layer which comprises one or more of rigid bodies formed from a hard material arranged with said composite.

As used herein, the "penetration resistance" of the article is the resistance to penetration by a designated threat. The designated threats include physical objects as for example, a threat, as for example, bullets, fragments, shrapnels and the like, threats also include non-physical objects such as blast from explosion and the like. The penetration resistance for designated threats can be expressed by at least three methods, V/50, total specific energy absorption and striking velocity vs. residual velocity. The V/50 is the velocity at which 50% of the threats will penetrate the composite while 50% will be stopped by the armor. For composite of equal areal density, which is the weight of the composite panel divided by the surface area, the higher the V/50, the better the resistance of the composite. The total specific energy absorption (SEAT) is the kinetic energy of the threat divided by the areal density of the composite. The higher the SEAT value, the better the resistance of the composite to the threat. When a threat strikes an armor panel at a velocity of (V/s), the residual striking velocity (V/r) is measured after the threat penetrates the composite. The larger the difference between (V/s) and (V/r), the better the resistance to the threat for composite panels of equal areal density.

In ballistic studies, the specific weight of the composites can be expressed in terms of the areal density (ADT). This areal density corresponds to the weight per unit of the ballistic resistant armor. In the case of fiber reinforced composites, the ballistic resistance of which depends mostly on fibers, another useful weight characteristic is the filament areal density of the composite. This term corresponds to the weight of the fiber reinforcement per unit area of the composite (AD).

As used herein, "rigid" means that the composite is not flexible. Rigidity is measured by clamping a 30 cm. composite horizontally along an edge with an overhang of 20 cm. and measuring the amount of drape of the composite. The composite is then rotated by 90° and by 180° and the amount of drape of the composite at 90° and 180° is measured. The amount of drape is measured by the vertical distance between the level of the clamped side edge and the opposite edge of the composite. Where the drape is about 0 cm. the composite is rigid.

Several advantages flow from this invention. For example, the articles and composite of this invention exhibit relatively improved penetration and blast resistance, reduced delamination and multiple hit capability as compared to other articles and composites of the same construction, composition and areal density but having no securing means.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS OF THE INVENTION

The preferred embodiments of this invention will be better understood by those of skill in the art by reference to the above figures. The preferred embodiments of this invention illustrated in the figures are not intended to be exhaustive or to limit the invention to the precise form disclosed. They are chosen to describe or to best explain the principles of the invention, and its application and practical use to thereby enable others skilled in the art to best utilize the invention.

Figure 1:
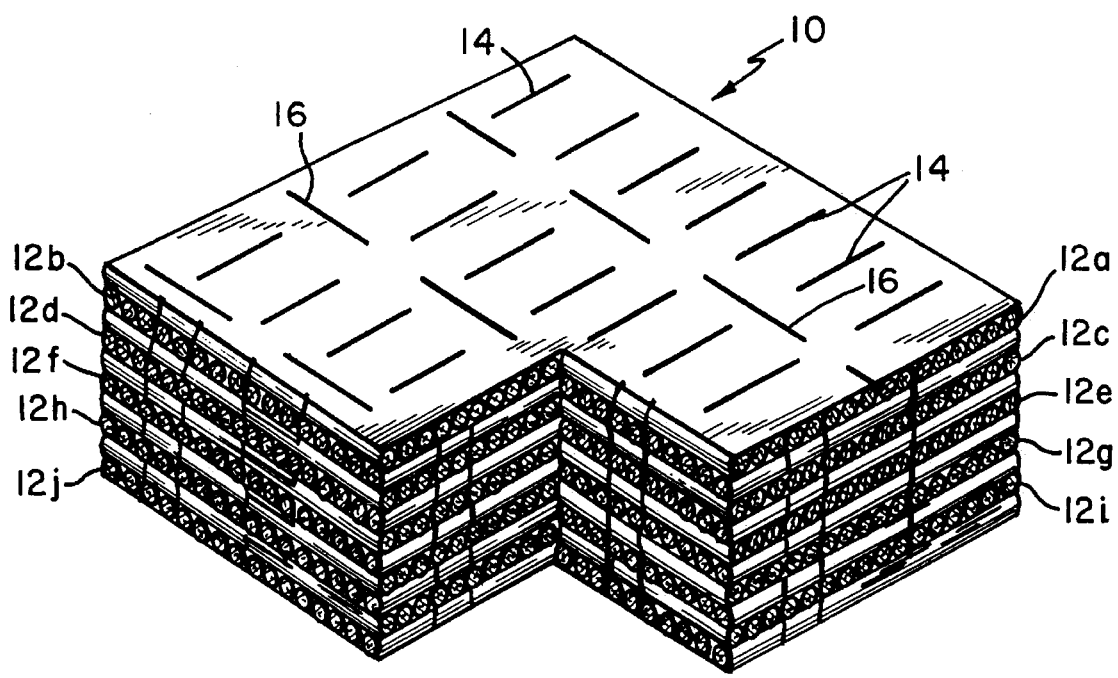
FIG. 1 is a fragmentary view of a preferred composite of this invention in which certain selected layers have been cut away.

Referring to FIG. 1, the numeral 10 indicates a penetration resistant composite 10, which in this preferred embodiment of the invention comprises a plurality of fibrous layers 12 which are secured together by a plurality of securing means 14 and 16, which layers 12 are wrapped about at least one axis thereof with girdle 18. The thickness of composite 10 may vary widely depending on the degree of penetration resistance required and provided that the composite is rigid. In general, the greater the thickness of the composite the greater the penetration resistance of the composite; and, conversely, the thinner the composite the less the penetration resistance of the composite. In the preferred embodiments of the invention, the thickness of the composite is from about 0.01 in. (0.025 cm.) to about 2 in. (5.08 cm.). The thickness of the composite is preferably from about 0.01 in. (0.025 cm.) to about 2 in. (5.08 cm.), more preferably from about 0.2 in. (0.5 cm.) to about 2 in. (5.08 cm.) and most preferably from about 0.05 in. (0.125 cm.) to about 2 in. (5.08 cm.).

As depicted in FIG. 1, article 10 is comprised of ten layers 12a to 12j which are secured together by a securing means 14 and 16, which in the illustrative embodiments of the invention depicted in the figure are stitches. While in the embodiment of the figures all fibrous layers 12a to 12j are secured together, it is contemplated that the number of layers 12 secured together may be as few as two, or any number of layers 12 in composite 10 may be secured together in any combination. In the preferred embodiments of the invention, all the layers are secured together.

The distance between paths defined by securing means 14 and between paths defined by securing means 16 holding fibrous layers 12a to 12 together may vary widely depending on the needs of the particular application. In the preferred embodiments of this invention, the distance between securing means 14 and/or securing means 16 is equal to or less than about 6 inches (15 cm.). While we do not wish to be bound by any theory, it is believed that when the distance is greater than 6 inches (15 cm.) the construction allows a higher level of delamination when a relatively heavy projectile (mass equal to or greater than 12 Kg and diameter equal to or greater than about 0.5 in. (1.27 cm.) penetrates through the composite. In general, the lower limit to the spacing between the paths defined by securing means 14 and 16 is not critical and theoretically the paths defined by securing means 14 and/or by securing means 16 can be as close as possible. However, for practical reasons and for convenience, the distance is usually not less than about ⅛ in. (0.3 cm.). In the preferred embodiments of the invention, the spacing between paths defined by securing means 14 and/or by securing means 16 is from about ⅛ in. (0.3 cm.) to about 6 in. (15 cm.). More preferred preferred spacings are from about ¼ in. (0.6 cm.) to about 5 in. (12.7 cm.) and most preferred spacings are from about ¼ in. (0.6 cm.) to about 4 in. (10 cm.).

Securing means 14 and 16 may be a continuous interconnection of various layers 12 where the paths forming securing means 14 and/or 16 do not include any regions where the various layers 12 are not interconnected. Securing means 14 and/or 16 may also be discontinuous, in which the path forming securing means 14 and/or 16 comprises regions where the various layers 12 are interconnected and other regions where there are no such interconnections.

In the embodiment of FIG. 1 where the various layers 12 are stitched together, the distance between various elements of securing means 14 and 16 is the stitch length, which can vary widely. In the preferred embodiments of the invention, the stitch length is less than about 5 cm.. In general, the lower limit may vary widely. More preferred stitch lengths are less than about 4 cm., and most preferred stitch lengths are from about 0.6 to about 2.6 cm., with the stitch lengths of choice being from about 0.6 to about 1.8 cm..

In the illustrative embodiment of FIG. 1, composite 10 has been depicted with two sets of substantially adjacent and substantially parallel securing means 14 and two sets of substantially adjacent and substantially parallel securing means 16, which means are substantially orthogonal with respect to each other intersecting at an angle of about 90° forming a plurality of substantially rectangular or square shaped patterns on the surface of composite 10, preferably in which the substantially adjacent and substantially parallel securing means 14 and 16 are separated by a distance of not more than 6 in. (15 cm.). This represents the most preferred aspects of the invention. It is contemplated that a single set of paths can be employed. Moreover, in those embodiments where multiple non-parallel securing means 14 and 16 are employed the paths need not be parallel and may intersect other than at right angles, as for example, at angles of from about 60° to about 150°, preferably from about 75° to about 135° and more preferably from about 85° to about 95°.

Layers 12 can be secured and interconnected together by any suitable securing means 14 and 16, so long as at least two of the securing means 14 and 16 interconnecting various layers 12 are within the critical spacing distances. Illustrative of suitable securing means are stapling, riveting, welding, heat bonding, adhesives, sewing and other securing means known to those of skill in the art.

In the preferred embodiments of this invention FIG. 1, stitches are utilized to form securing means 14 and 16. The type of stitches employed in these preferred embodiments of the invention may vary widely. Stitching and sewing methods such as lock stitching, hand stitching, multi-thread stitching, overedge stitching, flat seam stitching, chain stitching, zig-zag stitching and the like constitute the preferred securing means for use in this invention.

The angle of the stitch path is not critical and may vary widely. As used herein, the "angle of the stitch path" is formed between two diverging lines drawn from a common point on the composite exterior surfaces where one line is the shortest distance drawn perpendicularly through the composite while the other line is the actual stitch path. Generally, the angle of the stitch path is equal to or less than about 90°. The angle of the stitch path is preferably from about 0° to about 60°, more preferably from about 0° to about 45° and most preferably from about 0° to about 30°.

The amount of stitches employed may vary widely. In general in penetration resistance applications, the amount of stitches employed is such that the stitches comprise less than about 10% of the total weight of the stitched fibrous layers. The weight percent of stitches is preferably from about 0.01 to about 10, more preferably from about 0.02 to about 5 and most preferably from about 0.05 to about 1, on the aforementioned basis.

The type of stitches employed is not critical and may vary widely. Conventional stitching and sewing methods such as hand stitching, multi-thread chain stitching, over edge stitching, flat seam stitching, single thread lock stitching, lock stitching, chain stitching, zig-zag stitching and the like may be employed and no specific stitching type or method constitutes a preferred securing means for use in this invention.

The fiber used to form stitches 14 and 16 in these preferred embodiments can vary widely. Useful fiber may have a relatively low modulus or a relatively high modulus, and may have a relatively low tenacity or a relatively high tenacity. Fiber for use in stitches 14 and 16 preferably has a modulus equal to or greater than about 20 grams/denier and a tenacity equal to or greater than about 2 grams/denier. All tensile properties are evaluated by pulling at 10 in (25.4 cm.) fiber length clamped barrel clamps at 10 in/min (25.4 cm./min) on an Instron Tensile Tester. In the preferred embodiments of the invention, the modulus is equal or greater than about 30 grams/denier and the tenacity is equal to or greater than about 4 grams/denier (preferably from about 6 to about 50 grams/denier), more preferably the modulus is from about 40 to about 3000 grams/denier and the tenacity is from about 8 to about 50 grams/denier and most preferably the modulus is from about 300 to about 3000 grams/denier and the tenacity is from about 10 to about 50 grams/denier.

In the preferred embodiments of the invention, stitches 14 and 16 are formed of fibers. For purposes of the present invention, a fiber is defined as an elongated body, the length dimension of which is much greater than the dimensions of width and thickness. Accordingly, the term fiber as used herein includes a monofilament elongated body, a multifilament elongated body, ribbon, strip and the like having regular or irregular cross sections. The term fiber includes a plurality of any one or combination of the above. In the preferred embodiments of the invention, fiber for use in stitches 14 and 16 are multi-filament or monofilaments yarns, and are more preferably multifilament yarn.

The cross-section of monofilament fiber or of filaments of multifilament fiber for use in this invention may vary widely. Useful fiber may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

The denier of the fiber may vary widely. In general, fiber denier is equal to or less than about 20,000. In the preferred embodiments of the invention, fiber denier is from about 10 to about 20,000 in, the more preferred embodiments of the invention fiber denier is from about 10 to about 10,000 and in the most preferred embodiments of the invention fiber denier is from about 100 to about 10,000. Preferably, fibers for use in the invention consists of multi-ends of filaments. The denier of each filament preferably varies from about 1 to about 25 denier.

Fibers for use in stitches may vary widely and may be organic fibers, inorganic fibers or a combination thereof. Useful inorganic fibers include glass fibers (e.g. A-glass, C-glass and E-glass), silicon carbide fibers, boron fibers, aluminum silicate fibers, graphite fibers and the like.

Useful organic fibers include those formed from thermosetting (e.g. epoxy, phenolic and cyanated phenolic) or thermoplastic resins. More preferred for use in the practice of this invention are fibers formed from thermoplastic resins. Illustrative of useful and preferred fiber are those formed from thermoplastic polymers as for example aramids (aromatic polyamides), such as poly(phenylene terephthalamide) (Kevlar), poly(meta pheylene isophthalamide)and the like; aliphatic and cycloaliphatic polyamides, such as poly(hexamethylene adipamide)(nylon 66), poly(undecanamide-)(nylon 11), poly(hexamethylene sebacamide)(nylon 6, 10), polycaprolactam (nylon 6) and the like; aliphatic, cycloaliphatic and aromatic polyesters such as poly (1,4-cyclohexlidene dimethylene terephathalate) cis and trans, poly(ethylene terephthalate) and the like; polyvinyls such as poly(acrylonitrile), poly(vinyl alcohol), poly(vinyl chloride), poly(vinylidene chloride), poly(styrene), poly(tetrafluoroethylene), poly(vinylidene fluoride) and the like; polyolefins such as poly(ethylene), poly(propylene) and the like; polyurethanes such as those derived from the condensation of 1,4-butanediol and methylene di-isocyanate; and polyureas such as those formed by reaction between urea and aliphatic diamines such as nonamethylene diamine.

Also illustrative of useful organic fibers are those of liquid crystalline polymers such as lyotropic liquid crystalline polymers which include polypeptides such as poly-benzyl L-glutamate and the like; aromatic polyamides such as poly(1,4-benzamide), poly(4,4'-biphenylene 4,4'-bibenzo amide), poly(1,4-phenylene 4,4'-terephenylene amide), poly(1,4-phenylene 2,6-naphthol amide), and the like; polyoxamides such as those derived from 2,2'-dimethyl-4,4'-diamino biphenyl, chloro-1,4-phenylene diamine and the like; polyhydrazides such as poly chloroterephthalic hydrazide and the like; poly(amide hydrazides such as poly(terephthaloyl 1,4 amino-benzhydrazide) and those prepared from 4-amino-benzhydrazide, oxalic dihydrazide, terephthalic dihydrazide and para-aromatic diacid chlorides; polyesters such as poly(oxy-trans-1,4-cyclohexyleneoxycarbonyl-trans-1,4-cyclohexylenecarbonyl-trans- 1,4 phenyleneoxyterephthaloyl), poly(oxy-trans-1,4-cyclohexyleneoxycarbonyl-trans-1,- 4-cyclohexylenecarbonyl-β-oxy-(2-methyl 1,4-phenylene)oxy-terephthaloyl), and the like; polyazomethines such as those prepared from 4,4'-diaminobenzanilide and terephthalaldephide, methyl-1,4-phenylenediamine and terephthalaldelyde and the like; polyisocyanides such as poly(phenyl ethyl isocyanide), poly(nooctyl isocyanide) and the like; polyisocyanates such as poly(n-alkyl isocyanates) as for example poly(n-butyl isocyanate), poly(n-hexyl isocyanate) and the like; lyotropic crystalline polymers with heterocyclic units such as poly(1, 4-phenylene-2,6-benzobisoxazole)(PBO), poly[2,5(6)-benzimidazole] (AB-PBI) and the like; polyorganophosphazines such as polyphosphazine, polybisphenoxyphosphazine, poly [bis(2,2,2'trifluoroethyelene)] phosphazine and the like; metal polymers such as those derived by condensation of trans-bis(tri-n-butylphosphine)platinum dichloride with a bisacetylene or trans-bis(tri-n-butylphosphine)bis(1,4-butadynyl) platinum and similar combinations in the presence of cuprous iodine and an amide; cellulose and cellulose derivatives such as triacetate cellulose, acetate cellulose, acetate-butyrate cellulose, nitrate cellulose, sulfate cellulose, ethyl ether cellulose, hydroxypropyl ether cellulose, carboxymethyl ether cellulose, ethyl hydroxyethyl ether cellulose, cyanoethylethyl ether cellulose, acetoxyethyl ether cellulose, phenyl urethane cellulose and the like; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-naphthalene dicarboxylic acid, terephthalic acid, isophthalic acid and hydroquinone, and the like; and thermotropic polyamides and thermotropic copoly(amide-esters).

In the most preferred embodiments of the invention, the fibrous network of layers 12 are formed from polyethylene fiber, nylon 6 fiber nylon 66 fiber, poly(ethylene terephthalate) fiber, aramid fiber, fiber formed from liquid crystalline polymers such as liquid crystalline copolyester and combinations thereof. U.S. Pat. No. 4,457,985 generally discloses such high molecular weight polyethylene fibers and the disclosure of this patent is hereby incorporated by reference to the extent that it is not inconsistent herewith. In the case of polyethylene, suitable filaments are those of molecular weight of at least 150,000, preferably at least one million and more preferably between two million and five million. Such extended chain polyethylene (ECPE) fiber may be grown in solution as described in U.S. Pat. No. 4,137,394 or U.S. Pat. No. 4,356,138 or a fiber spun from a solution to form a gel structure, as described in German Off. 3,004,699 and GB 2051667, and especially described in U.S Pat. No.

4,551,296 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graff polyolefin copolymers and polyoxymethylenes, or low molecular weight additives such as anti-oxidants, lubricants, ultra-violet screening agents, colorants and the like which are commonly incorporated by reference. The tenacity of the fibers should be at least 15 grams/denier, preferably at least 20 grams/denier, more preferably at least 25 grams/denier and most preferably at least 30 grams/denier. Similarly, the tensile modulus of the filaments, as measured by an Instron tensile testing machine, is at least 300 grams/denier, preferably at least 500 grams/denier and more preferably at least 1,000 grams/denier and most preferably at least 1,200 grams/denier.

In the case of aramid fibers, suitable aramid fibers formed principally from aromatic polyamide are described in U.S. Pat. No. 3,671,542, which is hereby incorporated by reference. Preferred aramid fibers will have a tenacity of at least about 20 g/d, a tensile modulus of at least about 400 g/d and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the trade name Nomex.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d and preferably about 20 to about 25 g/d, and modulus of about 500 to 1500 g/d and preferably about 1000 to about 1200 g/d, are particularly desirable.

As depicted in FIG. 1, article 10 is comprised of ten layers 12a to 12j. However, the number of layers 12 included in article 10 may vary widely, provided that at least two layers are present. In general, the number of fibers in any embodiment will vary depending on the degree of penetration resistance desired. In general, the greater the number of layers 12 the greater the penetration resistance of the composite, and the lesser the number of layers 12 the lower the penetration resistance of the composite. The number of fibrous layers 12 is preferably from 2 to about 1500, more preferably from about 10 to about 1400 and most preferably from about 40 to about 1000.

Fibrous layers 12 comprise a network of fibers in a polymeric matrix. The type of fiber used in the fabrication of fibrous layer 12 may vary widely and may be selected from those useful as stitches 14 and 16 described above in the same preferences. For example, useful fibers may be formed from inorganic materials as for example graphite, boron, silicon nitride, silicon carbide, glass (e.g. A-glass, C-glass and E-glass) and the like. Useful fibers may also be formed from organic materials as for example thermosetting and thermoplastic polymers. However, the fiber used in fibrous layers 12 is preferably selected from the group consisting of aramid fiber (e.g. poly(phenylene terephthalamide), poly-(ethylene) fiber, nylon (e.g. nylon 6, nylon 11, nylon 6, 10 and nylon 6,6) fiber, linear polyester fiber (e.g. poly(ethylene terephthalate), liquid crystalline copolyester fiber or combinations thereof; more preferably is selected from the group consisting of aramid fiber, nylon 6 fiber, nylon 66 fiber, polyethylene fiber, poly(ethylene terephthalate) fiber and a combination thereof and most preferably is selected from the group consisting of aramid fiber, poly(ethylene) fiber or a combination thereof. Poly(ethylene) fiber is the fiber of choice.

Fibers in fibrous layers 12 may be arranged in networks (which can have various configurations) embedded or substantially embedded in a polymeric matrix which preferably substantially coats each filament contained in the fiber bundle. The manner in which the fibers are dispersed or embedded in the polymeric matrix may vary widely. For example, a plurality of filaments can be grouped together to form a twisted or untwisted yarn bundles in various alignment. The fibers may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation or aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable. The fibers may also be aligned in a substantially parallel, unidirectinal fashion, or fibers may be aligned in a multi-directional fashion with fibers at varying angles with each other. In preferred embodiments of the invention, the fibers in each layer 12 are aligned substantially parallel and undirectionally to form uniaxial layers 12 such as in a prepreg, pultruded sheet and the like as described in more detail in U.S. Pat. Nos. 4,623,574; 4,748,064; 4,916,000; 4,403,012; 4,457,985; 4,650,710; 4,681,792; 4,737,401; 4,543,286; 4,563,392; and 4,501,856.

Wetting and adhesion of fibers in the polymer matrices, is enhanced by prior treatment of the surface of the fibers. The method of surface treatment may be chemical, physical or a combination of chemical and physical actions. Examples of purely chemical treatments are used of $SO_3$ or chlorosulfonic acid. Examples of combined chemical and physical treatments are corona discharge treatment or plasma treatment using one of several commonly available machines.

The matrix material may vary widely and may be formed of any thermoplastic polymer,thermosetting resin or a mixture thereof. Suitable polymeric matrix materials include those mentioned below for use in the formation of the fibers of stitches 14 and 16, and layers 12. Useful matrix polymer materials may exhibit relatively high modulus e.g.equal to or less than about 500 psi (3450 kPa) or may exhibit relatively high modulus e.g. greater than about 500 psi (3450 kPa).

In one preferred embodiments of the invention the matrix material is a relatively high modulus blend of one or more thermoplastic polymers and one or more thermosetting resins. The choice of thermoplastic polymer and thermosetting resin and their relative amounts may vary widely depending on the desired characteristics of the composite.

Useful matrix materials are described in more detail in PCT WO 91/08895 and are preferably a mixture of thermosetting vinyl ester resin and a thermoplastic polyurethane.

In another preferred embodiment of this invention the matrix material is selected from the group consisting of relatively low modulus elastomeric materials. A wide variety of elastomeric materials and formulation may be utilized in the preferred embodiments of this invention. Representative examples of suitable elastomeric materials for use in the formation of the matrix are those which have their structures, properties, and formulations together with cross-linking procedures summarized in the Encyclopedia of Polymer Science, Volume 5 in the section Elastomers-Synthetic (John Wiley & Sons Inc., 1964)and those which are described in U.S. Pat. No. 4,916,000. These matrix materials are preferably block copolymers of conjugated dienes such as butadiene and isoprene are vinyl aromatic monomers such as styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multiblock copolymers of the type (AB)n (n=2–10) or radial configuration copolymers of the type R-(BA)x (x=3–150); wherein A is a block from a polyvinyl aromatic monomer and B is a block from a conjugated dien elastomer. Many of these polymers are produced commercially by the Shell Chemical Co. and described in the bulletin "Kraton Thermoplastic Rubber", SC-68-81. The volume ratios of resin to fiber may vary. In general, the volume percent of the resin may vary from about 5 to about 70 vol. % based on the total volume of layer 12. In the preferred embodiments of the invention, the volume percent of the resin is from about 5 to about 50 vol. %, in the more preferred embodiments of this invention is from about 10 to about 40 vol. % and in the most preferred embodiments of this invention is from about 15 to about 30 vol. % on the aforementioned basis.

Layers 12 can be fabricated using conventional procedures. For example, layer 12 can be formed by making the combination of fibers and matrix material in the desired configurations (such as a woven or non-woven fabric and layers in which fibers are aligned in a substantially parallel, unidirectional fashion), and amounts, and then subjecting the combination to heat and pressure using conventional procedures as for example those described in U.S. Pat. No. 4,916,000; 4,403,012; 4,737,40.1; 4,623,574; and 4,501, 856; and PCT WO/91/08895.

Composite 10 can be formed by any conventional procedure. For example, one such conventional procedure for forming involves pre-forming a multilayer laminate and thereafter subjecting the laminate to a suitable stitching procedure such as sewing or drilling holes and guiding yarn through the holes to form composite 10 in which the stitch length is greater than the stitch path. One such procedure where composite 10 comprises fibrous layers where the fiber network is a knitted, woven or non-woven fabric involves aligning the desired number of layers formed of knitted, woven or non-woven fabric in a polymeric matrix and thereafter molding said aligned layers 12 at a suitable temperature and pressure to form a laminate structure of the desired thickness which can be stitched employing suitable stitching means such that the stitch length is greater than the stitch path. Another suitable procedure is where composite 10 comprises a laminate comprised of a plurality of layers 12 in which the polymer forming the matrix coats or substantially coats the filaments of multi-filament fibers and the coated fibers are arranged in a sheet-like array and aligned parallel to another along a common fiber direction. Successive layers of such coated, uni-directional fibers can be rotated with respect to the previous layer to form a laminated structure which can be wrapped with the desired number of fibrous layers to form layers 12 wrapped with girdle 18. An example of such laminate structures are composites with the second, third, fourth and fifth 12 layers rotated +45°, −45°, 90° and 0°, with respect to the first layer 12, but not necessarily in that order which layers 12 are wrapped with one or more layers having the same or substantially same relative orientation to form alyers 12 wrapped with girdle 18. Other examples include layers 12 and girdles 18 with 0°/90° layout of yarn or filaments. The laminates composed of the desired number of layers 12 wrapped with girdle 18 can be molded at a suitable temperature and pressure to form a composite 10 having a desired thickness. Temperatures and .second pressures are preferably equal to or greater than about 50° C. anti about 700 kPa, respectively. Second temperatures and second presssures are more preferably from about 80° C. to about 300° C. and from about 700 kPa to about 3,000 kPa, respectively, and most preferably from about 110° C. to about 250° C. and from about 1,000 to about 2,000 kPa, respectively. Techniques for fabricating these laminated structures are described in greater detail in U.S. Pat. Nos. 4,916,000; 4,623,574; 4,748,064; 4,457,985 and 4,403,012.

The laminated layers can be stitched together to form composite 10 using a suitable stitching means. Suitable stitching means include sewing machines, combination of drills and needles, and the like.

Figure 2:
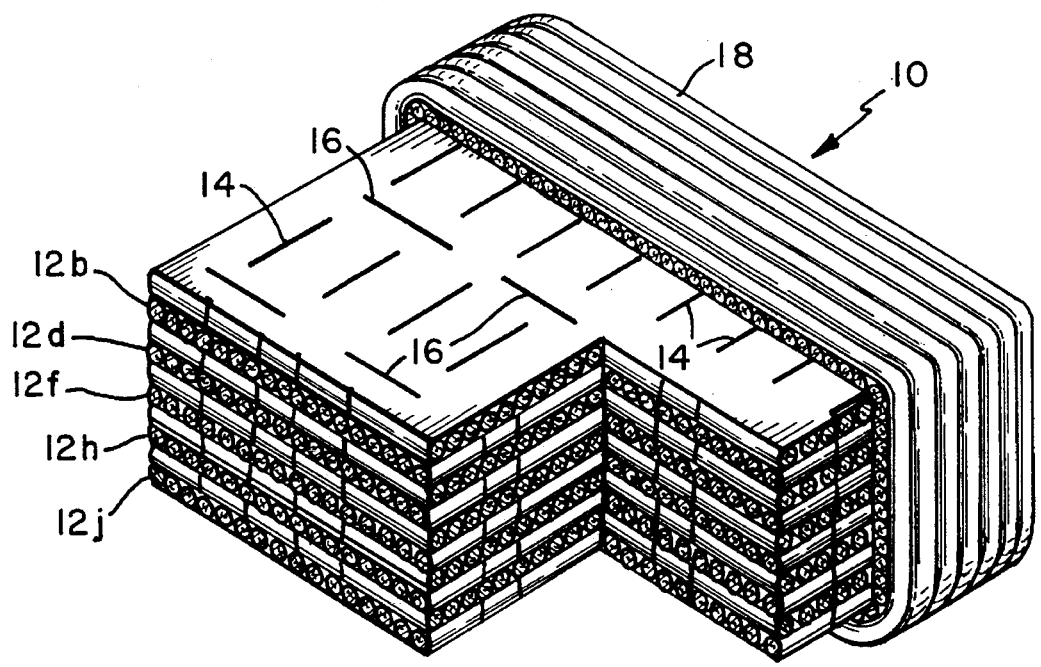
FIG. 2 is a fragmentary view of another preferred embodiments of the invention in which certain selected layers have been cut away.

FIG. 2 illustrates another preferred embodiment of the invention. As shown in FIG. 2, while not essential, composite 10 of this invention includes a girdle 18 comprised of one or more fibrous layers formed of a network of fibers either alone or in a polymeric network encircling all or a portion of aligned layers 12 about an major axis of composite 10. Girdle 18 can be wound around aligned layers 12 and maintained in place by tension, or by other suitable attaching means such as adhesives such as polysulfides, epoxies, phenolics, elastomers, and the like, or mechanical means such as staples, rivets, bolts, screws or the like. In the specific embodiment illustrated in FIG. 2 reinforcing girdle 18 comprises one fibrous layer. However, various embodiments of the invention may comprise more than one fibrous layer in which the fibers of the fibrous network are arranged in any fashion in substantially the same way as in layers 12 with the same preferences. For example, girdle 18 may comprise the two layers of fibers wrapped about the axis in a sheet-like array and aligned parallel to one another along a common filament direction. Reinforcing girdle 18 can further comprise two or more layers of fibers oriented at an angle i.e. 90°, 45° etc. with respect to their common filament direction. It should be appreciated that any number of additional layers of fibers at varying angles with respect to fiber direction in adjacent layers may be employed.

The fibers forming girdle 18 may be arranged in networks having various configurations having the same construction and fibers as layers 12, in the same preference. For example, plurality of filaments can be grouped together to form a twisted or untwisted yarn bundles in various alignment. In preferred embodiments of the invention, aramid fiber, polyethylene fiber or a combination thereof are aligned substantially parallel and unidirectionally to form a uniaxial layer in which a matrix material substantially coats the individual filaments in the fiber bundle. Two or more of these layers can be used to wrap aligned layers 12 to form a composite girdle 18 with multiple layers of coated undirectional filaments in which each layer is rotated with respect to its adjacent layer as depicted in FIG. 1.

An example is a multilayer girdle 18 with the second, third, fourth and fifth layers rotated +45°, −45°, 90° and 0° with respect to the first layer, but not necessarily in that order. Other examples include a multilayer girdle 18, with a 0°/90° layout of yarn or filaments.

The composites of this invention can be used for conventional purposes using conventional fabrication procedures. For example, such composites can be used in the fabrication of penetration and blast resistant articles and the like using conventional methods. The articles are particularly useful as vehicular armor or penetration resistant articles such as armor for tanks, airplanes, helicopters, armored personnel carriers and the like. The composite of this invention can be conveniently used for such purposes using conventional procedures and vehicles. The composite of this invention may also be used in the fabrication of blast resistant articles such as cargo compartments of aircraft, containers for explosives and the like.

The following examples are presented to provide a more complete understanding of the invention and are not to be construed as limitations thereon. In the following examples, the following terms are used.

(a) Denier: Denier is a unit indicating the heaviness of fibers. 1 denier means that 9 km of the fiber weighs 1 g.

(b) Pitch of stitching: Distance between the adjacent stitching holes.

Comparative Example 1

Spectra® polyethylene fiber composite panel of 2 in. (5.1 cm) thickness and 6 inch×6 inch (15.2 cm.) size was constructed by 0°/90° degree lamination of uniaxial Spectra® polyethylene fiber prepreg sheets and press-molding. This composite panel was impacted with a designated threat projectile at a velocity of 3500 feet/sec (1067 m/sec). The composite panel separated into 3 separate pieces by delaminating completely at 2 positions in the thickness direction of the laminate.

Example 1

The composite panel as described in Comparative Example 1 was reinforcement by stitching in the transversal direction as illustrated using 2200 denier Spectra® yarn. The pitch of stitching was 1.25 inch (3.2 cm.) and the stitching line was at 0.5 inches (1.27 cm.) inside the edge of panel.

This panel was impacted with the designated threat projectile of Comparative Example 1 at a velocity of 3500 ft/sec (1067 m/sec). The panel deformed but delamination was reduced and the panel remained intact as one piece without separating into pieces.

Example 2

The composite panel described in Example 1 was wrapped with the uniaxial Spectra® fiber prepreg sheet as shown in FIG. 2. The wrapping was done in the manner of 0°/90° degree laminating to a thickness of 0.053 inches (0.135 cm.). After the wrapping, an autoclave press molding was conducted to consolidate the wrapping.

This panel was impacted by the designated threat projectile of Comparative Example 1 at velocity of 3500 ft/sec (1067 m/sec). The panel was deformed but the delamination was reduced further in comparison to the case of Example 1.

Comparative Example 2

Spectra® composite armor panel was constructed by 0°/90° degree lamination of uniaxial Spectra® fiber prepreg sheet to a thickness of 0.25 inch (0.64 cm.) and size of approximately 12 inch (30.5 cm.)×12 inch (30.5 cm.).

This composite panel was impacted by the designated projectile of Comparative Example 1 at a velocity of 760 ft/sec (132 m/sec). After impact, the depth of penetration was measured and found to be 0.105 inch (0.263 cm.).

Example 3

The Spectra® composite armor panel of Comparative Example 2 was stitched. Spectra® stitching yarn denier was 555 denier, pitch of stitching was 0.2 inch (0.51 cm.) and the stitching along the edges was 0.5 inch inside the edges of panel. Distance between the two adjacent stitching lines was ⅛ inch (0.32 cm.).

This panel was impacted at the center of panel with the designated threat projectile of Comparative Example 2 at a velocity of 811 ft/sec (247 m/sec) and the depth of penetration was measured and found to be 0.083 inch (0.21 cm.). Thus, in comparison to Comparative Example 2, the depth of penetration decreased by 21% although the impact velocity was approximately 7% higher (hence the impact kinetic energy was approximately 14% higher).

The same panel was impacted at the center of a quadrant section with the designated projectile of Comparative Example 2 at 798 ft/sec (243 m/sec) and the depth of penetration was measured to be 0.08 inch (0.2 cm.) which is very close to the value in the case of impacting at the center described above.

Example 4

The Spectra® composite armor panel of Example 1 was stitched with Spectra® yarn. Stitching yarn denier was 1125 denier, pitch of stitching was 0.2 inch (0.51 cm.) and the spacing of the parallel stitching lines was ½ inch (1.27 cm.).

This panel was impacted at the center with the designated projectile of Comparative Example 2 at 788 ft/sec (240 m/sec) and the depth of penetration was measured and found to be 0.085 inch (0.22 cm.).

What is claimed is:

1. An improved rigid penetration resistant composite comprising a plurality of fibrous layers comprising fiber in a matrix, at least two layers of which are secured together by at least two means, each of which extends along a different path and through at least two of said fibrous layers to separately secure the same together, said at least two means comprising a plurality of first stitches at least two of which extend along at least a portion of two adjacent paths, said composite further comprising a fibrous girdle comprising a fibrous network in a matrix substantially continuously encircling said secured fibrous layers about an axis thereof.

2. The improved composite of claim 1 wherein the first stitches comprise fiber and wherein the fiber of said first stitches and the fiber of said fibrous layers are selected from the group consisting of fibers having a tenacity of from about 6 to about 50 grams/denier and a modulus of from about 30 to about 3000 grams/denier.

3. The improved composite of claim 2 wherein said tenacity is from about 8 to about 50 grams/denier and said modulus is from about 40 to about 3000 gram/denier.

4. The improved composite of claim 3 wherein said tenacity is from about 10 to about 50 grams/denier and said modulus is from about 50 to about 3000 grams/denier.

5. The improved composite of claim 4 wherein said tenacity is from about 20 to about 50 grams/denier and said modulus is from about 1000 to about 3000 grams/denier.

6. The improved composite of claim 1 wherein the fiber of the secured fibrous layers is selected from the group consisting of polyethylene fiber, aramid fiber and combination thereof.

7. The improved composite of claim 6 wherein the fiber of the secured fibrous layers is polyethylene fiber.

8. The improved composite of claim 7 wherein said first stitches comprise aramid thread.

9. The improved composite of claim 1 wherein said adjacent paths of said first stitches are parallel or substantially parallel.

10. The improved composite of claim 9 which further comprises a plurality of second stitches at least two of which extend along at least a portion of two adjacent paths, the adjacent paths of said first stitches being disposed at an angle to the adjacent paths of said second stitches.

11. The improved composite of claim 10 wherein said angle is from about 45° to about 90°.

12. The improved composite of claim 11 wherein said angle is about 90°.

13. The improved composite of claim 9 wherein the distances between said adjacent paths is not less than about ⅛ in. (0.3 cm.).

14. The improved composite of claim 13 wherein the distances between said adjacent paths is from about ⅛ in. (0.3) to about 6 in. (15 cm.).

15. The improved composite of claim 14 wherein said distance is from about ¼ in. (0.6) to about 5 in. (12.7 cm.).

16. The improved composite of claim 15, wherein said distance is from about ¼ in. (0.6) to about 4 in. (10 cm.).

17. The improved composite of claim 1, wherein said stitches extend a length equal to or less than about 5 cm.

18. The improved composite of claim 17 wherein said stitches extend a length equal to or less than about 4 cm.

19. The improved composite of claim 18 wherein said stitches extend a length of from about 0.6 to about 2.6 cm.

20. The improved composite of claim 19 wherein said stitches extend a length of from about 0.6 to 1.8 cm.

21. The improved composite of claim 1 wherein said fibers in said fibrous girdle and said fibers of said fibrous layers are arranged substantially parallel to one another along a common fiber direction.

22. The improved composite of claim 21 wherein the longitudinal axes of the fibers in one layer are aligned at an angle with respect to the longitudinal axes of the fibers in an adjacent layer.

23. The improved composite of claim 22 wherein said angle is from about 45° to about 90°.

24. The improved composite of claim 23, wherein said angle is about 90°.

25. The improved composite of claim 1 wherein said fibrous layer comprises a woven fabric, a non-woven fabric or a combination thereof.

26. A ballistic resistant article of manufacture comprising the rigid composite of claim 1.

* * * * *